Aug. 11, 1942.  C. L. EKSERGIAN  2,292,621
BRAKE CONTROL
Filed Aug. 28, 1940  4 Sheets-Sheet 1
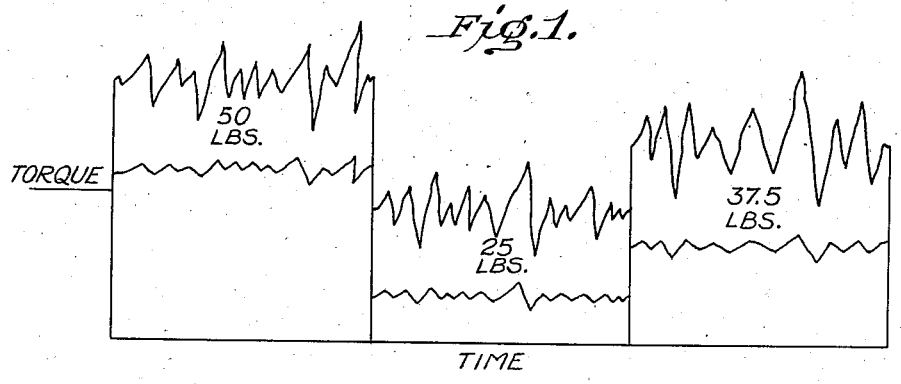
Fig. 1.
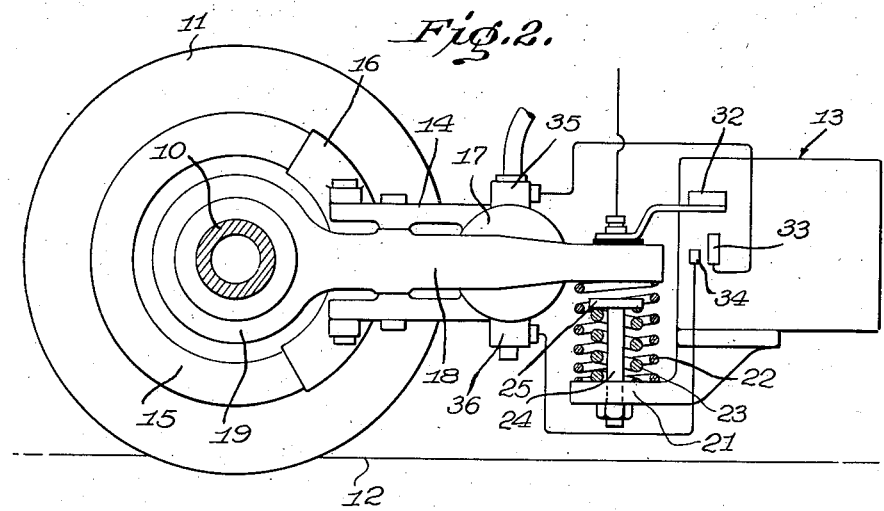
Fig. 2.
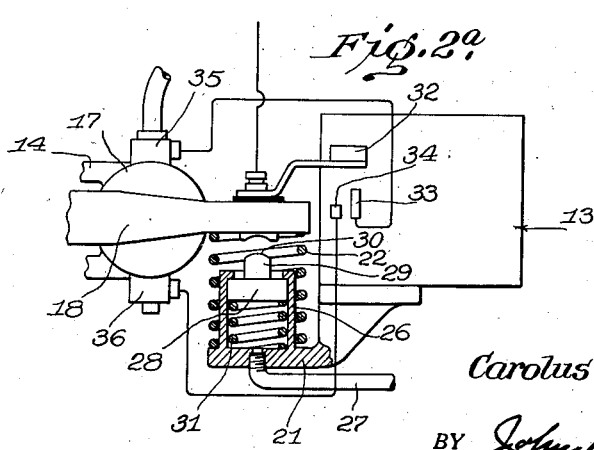
Fig. 2ª.
INVENTOR
Carolus L. Eksergian
BY John P. Pachox
ATTORNEY Aug. 11, 1942.    C. L. EKSERGIAN    2,292,621
BRAKE CONTROL
Filed Aug. 28, 1940    4 Sheets-Sheet 3

INVENTOR
Carolus L. Eksergian
BY John P. Dacky
ATTORNEY

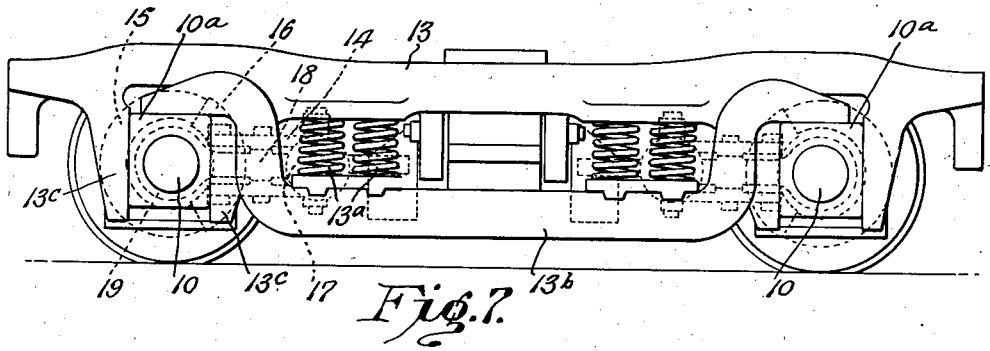
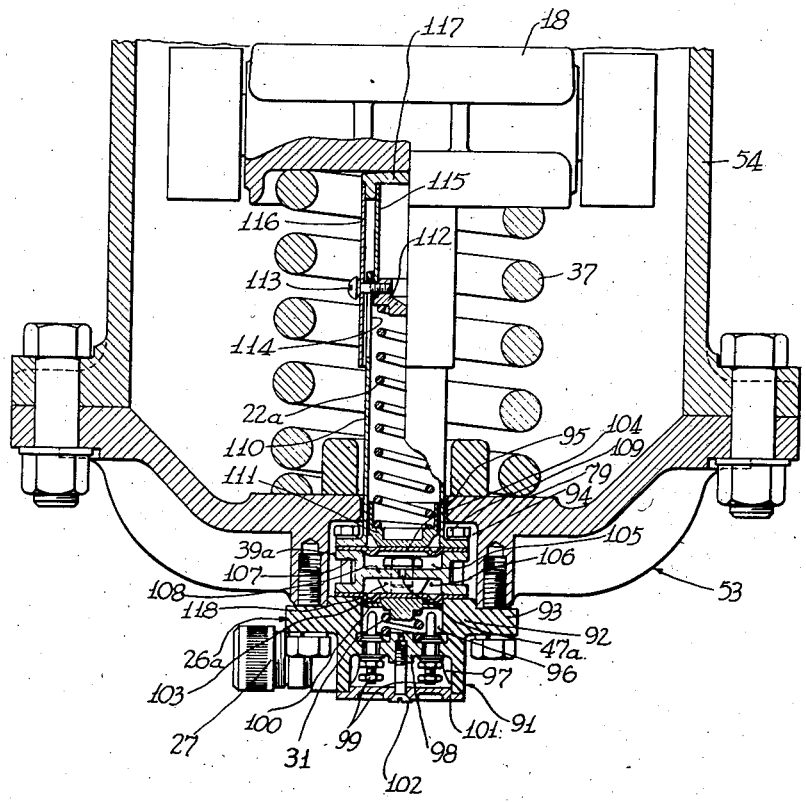

Patented Aug. 11, 1942

2,292,621

UNITED STATES PATENT OFFICE 2,292,621

BRAKE CONTROL

Carolus L. Eksergian, Detroit, Mich., assignor to Budd Wheel Company, Philadelphia, Pa., a corporation of Pennsylvania Application August 28, 1940, Serial No. 354,541

24 Claims. (Cl. 188—181)

My invention relates to the control of railway brakes through the torque developed and is a further development of the control disclosed and broadly claimed in my copending application Serial No. 271,081 for Braking mechanism, filed May 1, 1939.

The outstanding object of my invention is to iron out those variations in torque measurement which are occasioned by the inertia of the brake foundation. A typical curve of torque measurements containing such variations is shown in the top curve of Figure 1 of the drawings appended hereto. These variations are so very considerable and so frequent that a torque measurement which follows them will give false indications of the true torque developed by the brake. Hence, if this measurement is used to control the brake, it will not be controlled in accordance with the precise torque which is being developed.

The reaction between the brake support and the truck frame is a function of the torque developed by the brake plus the inertia of the brake foundation. In order to obtain a torque registry through measurement of support reaction, it becomes necessary to divorce the effect of foundation inertia from brake torque.

Further according to my invention, I propose to utilize the torque measurement in connection with which such variations have been ironed out, so to speak, to regulatively control the developed torque of the brake in conformance with an applied pilot pressure. By pilot pressure here is meant the pressure in the operator controlled pilot line corresponding to the called-for pressure in the brake cylinder. Such pilot pressure is directly proportional to the brake cylinder pressure. Such application under torque control is possessed of a considerable number of advantages, among them being the minimizing of wheel-slip, and the certainty on the part of the engineer who applies the brakes that for every definite movement of the brake lever corresponding to definite train line pressure (which train line pressure may be indicated by a pressure gauge in the cab itself), he will have developed a torque either equal to or limited to within an assigned value as defined by the arbitrarily pre-established relationship between torque and pilot or brake cylinder pressure—as provided by the particular type of torque control employed (limiting or regulating).

Figure 1 is a diagram showing typical curves depicting the movement of the free end of the torque arm, the one at the top indicating a curve due to the combined influence of torque and inertia, and the one at the bottom indicating a curve due to torque alone.

Figure 2 shows a simple arrangement of springs connected with an arm for measuring the torque.

Figure 2a shows a modification using springs in combination with pilot line pressure.

Figure 6 is a similar view of still another and preferred form of such instrument.

Figure 7 is a side elevation of a typical truck structure to which the invention may be applied.

Figure 3:
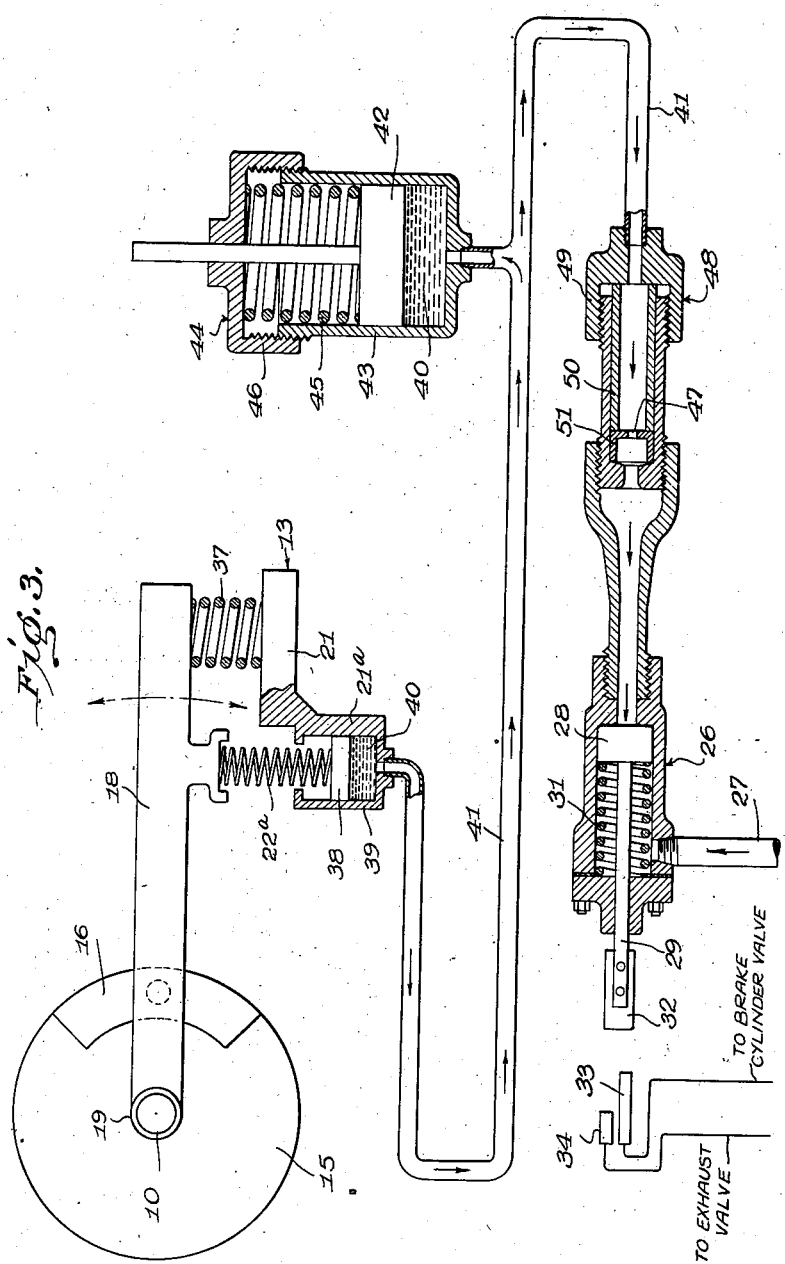
Figure 3 shows diagrammatically an hydraulic system for carrying out my invention and through which diagrammatic showing the invention of the following specific embodiments will be the more readily understood.

Referring now first to Figure 1, which depicts two curves in which the support spring deflections during braking are plotted against time for different brake cylinder pressures, the upper curve depicts the combined effect of the inertia of the brake foundation and the torque developed. It will be observed that, at all times during the application of the brake, the torque measurement is very markedly affected even though in a superficial manner by the multitudinous oscillations and movements between truck frame and brake support. This curve is representative of those made by supporting the brake segments or shoes upon a torque arm anchored to the frame through a calibrated spring, and recording the relative movements of the torque arm with respect to the frame through an appropriate instrument. Many such records have been made by me. Obviously the amplitude of these variations are such as to seriously affect fine and certain control of the brake through any control device responsive to these reaction measurements. I propose through the integration of these variations to attain a fine and certain control.

The lower curve in Figure 1 is representative of a curve indicating approximately the true torque measurements with the above variations ironed out. Such true torque measurement is obtained by the use of my invention. Obviously, this lower curve corresponds to lower brake cylinder pressures than those indicated in connection with the upper curve.

Now referring to Figure 2, I show also diagrammatically a truck axle 10 supported by wheels, as 11, from the track indicated at 12. The truck frame 13 may be sprung in any usual manner, as shown for example, in the Eksergian et al. patent, #2,253,268, entitled "Brake mechanism," issued August 19, 1941, on an application filed March 1, 1940, and as also shown in Fig. 7 of this application, from the axles, as 10, by a spring system appropriately connected with the axle. This system is shown in Figure 7 as comprising the springs 13a arranged in the usual manner between the truck frame 13 and the equalizer bars, as 13b, supported at their opposite ends on the axle boxes 10a. The axle boxes may be guided, as usual, for vertical movement in the pedestals 13c of the truck frame.

I utilize for braking a radial brake disc 15 carried by the wheel or axle. Segmental shoes, as 16, coact with this disc and are applied to the opposite faces thereof by an air cylinder 17 acting through levers, as 14. The shoes, cylinder and actuating levers are usually supported upon a torque arm 18 journalled at one end 19 upon the axle and at the opposite end supported from the frame 13 through the intermediary of a single calibrated spring, or a pair of calibrated springs arranged, respectively, above and below the arm, similar to the arrangement shown in U. S. application Ser. No. 270,750, filed April 29, 1939, now Patent No. 2,236,898, issued April 1, 1941.

When such spring is sufficiently short to be located within the available spacing, it has to be so stiff that it possesses a vibration rate and a susceptibility to oscillation under the relative movements of the truck frame and the brake support such as will produce the irregularities of reaction measurement illustrated in the top curve of Figure 1. If there were space available and one could use a spring of a much lower spring rate, one might damp these troublesome oscillations out or spread them over such a length that they would not be troublesome. But there is not space available for such a long, soft spring.

One of the first solutions of the problem according to my invention is illustrated in Figure 2. In this figure, the spring 22 seats on a spring support 21 from the frame 13 and carries the normal load of the brake foundation or support as applied thereto through arm 18. The spring is relatively light instead of relatively heavy, thus affording a relatively large amplitude of movement and a slow rate. Thus, under conditions in which there are no applications of the brakes or under extremely light applications of the brakes, a low frequency—and accordingly a small change in reaction—of oscillation of the brake support relative to the frame, results.

Coacting with this spring 22 is an inner and concentric spring 23 which is precompressed and which possesses a low spring rate under the loading corresponding to an applied braking torque of a determinate range of magnitude. Under these conditions, when the brake is applied through an operating pressure in the cylinder 17 which is sufficient to move the torque arm 18 through an angle which contacts the arm with the inner spring 23, the spring 23 adds its effect to that of spring 22 and together they react to measure through the resultant regulated movements of the torque arm 18 an integrated torque free from the harmful effects of the variations above-referred to.

This inner spring 23 is precompressed under initial compression through an adjustable through-running rod 24 between the spring seat 21 and a cup 25 which confines the upper end of the spring.

Obviously I might multiply the number of such concentrically (or parallelly) arranged springs successively stepping up the spring rate to maintain a low frequency rate as the torque is stepped up by successively increased increments of pilot pressure.

Further according to my invention, however, I simplify such modification by substituting for springs of stepped-up rate an air cylinder 26 appearing in the form of my invention illustrated in Figure 2a. In this form of my invention, there is provided a spring 22 of low spring rate and low range having the same function as the spring 22 of the form of Figure 1. Concentrically arranged with this spring is the cylinder 26 which receives pilot pressure by a branch 27 from the pilot line (not shown) which is controlled by the engineer's valve to place in it a determinate pressure for each valve operation and preferably for each degree of valve lever movement (both of which are well known). In this cylinder 26 is a piston 28, the rod 29 of which is projected upwardly through an open top of the cylinder and is provided with a head 30 adapted to be engaged by the torque arm 18 in the course of its descent. Beneath piston 28 is a relatively light spring 31 urging it upwardly for a purpose which will hereinafter appear.

In this form of the invention, spring 22 takes care of the zero braking torque and light braking conditions as before. When, however, these are exceeded, arm 18 contacts the head 30 and is opposed in further movement by the air pressure within the cylinder 26, and opposed to a degree and at a rate proportionate to the existing pilot pressure. Thus the pilot pressure in the cylinder 26 takes the place of a multiple number of concentrically and parallelly arranged springs. A high air pressure will give a heavy, not so readily yielding action. The system thus becomes self-adjusted as to spring rate.

In both the forms of Figures 2 and 2a, connected with the arm 18 is a contact 32 which cooperates with two fixed contacts 33 and 34 which govern, respectively, control devices governing the application of air to the brake cylinder and the exhaust of air therefrom and shown diagrammatically as electromagnetically operated valve devices 35 and 36. Thus, as the torque increases to a point where it is desirable that the further admission of air to the brake cylinders be cut off, contact 32 wipes over the contact 33 closing an electric circuit for operating electromagnetically operated, normally open valve 35 to cut off admission of air to the cylinder. If the torque increases further after the admission of air to the brake cylinder has been stopped, the contact 32 will engage contact 34 to close a circuit to operate the electromagnetic valve device 36 to exhaust air from the cylinder and this releases the air pressure. This relation will be maintained for such time as is requisite to reduce the torque. When the torque is reduced, the pressure of arm 18 upon springs 22 and 23 (Figure 2) or upon the head 30 of the piston 28 of cylinder 26 (Figure 2a) is decreased and the arm rises, moving contact 32 upwardly and opening the circuits of the control devices 35 and 36, successively, whereupon pre-existing conditions are restored. With appropriate spaces between the several contacts, the device will be sure in its operation and free from hunting.

Of advantage in stabilizing the operation of the device shown in Figure 2a is the provision of spring 31. Once the pilot pressure in cylinder 26 has been overcome, if there were no spring 31 beneath the piston, piston 28 would move to the bottom of cylinder 26 and there would be nothing to return to toward normal. The utilization of a calibrated spring 31 affords a gradually increasing opposing force which comes into play in and about the region in which contacts 32, 33 and 34 are engaged to provide graduated movement thereof under the influence of the steadily maintained pilot pressure set by the engineer, and this graduated movement insures successive differentiation between cut-off and exhaust.

The pilot pressure supplemented by a hydraulic system is utilized, as shown diagrammatically in Figure 3, in order to afford a full explanation of an enlargement of my system. Correspondingly numbered parts have corresponding functions. According to this diagram, a short stiff calibrated spring of relatively high rate, designated 37, is utilized to take the entire full load reaction entirely independently of the measuring device through which the torque control is to be effected. Accordingly, a light spring 22a is arranged in parallel with the spring 37 but also between the arm 18 and spring seat 21 through an extension 21a thereof.

The high frequency oscillations of the torque arm 18, brought about by the inertia conditions previously described, cause the light torque measuring spring 22a to oscillate likewise. This spring oscillation, in turn, imposes on a hydraulic system now to be described a like series of intermittent impulses or surges, which are subsequently damped out in the system.

Such hydraulic system may comprise a cylinder 39 upon the piston 38 of which the spring 22a acts to force fluid 40 through a conduit 41, provided with a restricting device 48 including a small orifice 47, to a pilot pressure cylinder 26 to act upon the piston 28 therein. The intermittent impulses or surges are damped out due to the restriction of free flow in the conduit 41 resulting mainly from the restricted orifice 47. In addition, there is a certain amount of damping due to the pipe line friction of the conduit 41 per se.

The action of restricting device 48 may be varied by merely unscrewing the head 49, removing the ferrule 50 and the small cup 51 which contains the orifice 47, and supplying a similar cup having a different size orifice.

Although the spring 22a itself acts to damp out the surges such as would obtain if the torque arm transmitted its oscillations directly to the hydraulic system, it may be desirable to employ an additional surge relief device in the form of an expansion chamber 44 shown connected to the conduit 41.

This expansion chamber may comprise a cylinder 43 guiding a piston 42 to one side of which the fluid 40 from conduit 41 is admitted, the pressure of the fluid being opposed by a calibrated spring 45, the normal pressure of which is adjustable by a retaining cap 46.

With the surges in the system thus accommodated, it follows that the fluid pressures on the far side of the orifice 47 from cylinder 39 become those which obtain solely under a sustained state, which is in actuality the state resulting from a direct proportionality of the torque reaction between arm 18 and truck frame support 21 acting alone and independent of inertia. Hence the fluid pressure existing between orifice 47 and cylinder 26 acting on piston 28 may be regarded as the true measure of torque as divorced from variations due to inertia.

The cylinder 26 may then be utilized to operate the control circuits controlled by contacts 32, 33 and 34 in the following manner. The piston 28 has connected to its rod 29 the contact 32, and its movement under the pressure of the hydraulic system is opposed by the pilot air pressure through branch 27 and the calibrated spring 31. Normally the spring 31 is in a pre-compressed state, holding the piston against the head of the cylinder 26. In this state, it provides sufficient force to prevent piston movement that might otherwise result from inertia oscillations acting alone and independent of the reaction from torque. When the brakes are applied, the pilot pressure adds to the spring 31 to hold the piston 28 from moving away from the cylinder head against the fluid pressure now being built up because of the brake torque. As long as the fluid pressure, and therefore the proportional part of the brake torque transmitted to the hydraulic system, is less than the resultant of pilot pressure and the pressure of spring 31, the piston remains in contact with the head of cylinder 26, no piston movement resulting. When, however, the fluid pressure, measuring the braking torque or the force proportional thereto, acting on the system exceeds the combined action of the pilot line pressure and pressure of spring 31, then the piston 28 moves outward against the increasing pressure of spring 31, and finally closes an application valve device 35, shown in Figure 2, through the closure of the application circuit controlled by contacts 32 and 33 shutting off any further flow of air to the brake cylinder.

If, in spite of this pressure restriction, the torque and accordingly the fluid pressure back of piston 28 continues to increase, then the piston 28 continues to move outward until contact 32 also engages contact 34, thereby closing the circuit controlling the exhaust device 36, Fig. 2, and relieving pressure in the brake cylinder 17.

This condition maintains until sufficient pressure reduction is obtained in the brake cylinder to reduce the torque, and accordingly the hydraulic pressure back of piston 28, to a point which will permit the piston to return and open the control circuits to restore the parts to normal operation.

It should be noted that a measurable amount of piston movement is provided before contact 32 may engage contact 33. This enables, without making contact, slight movement of the piston which might be brought about by any momentary surges which might leak through orifice 47 and accordingly make themselves felt on the piston 28.

Figure 4:
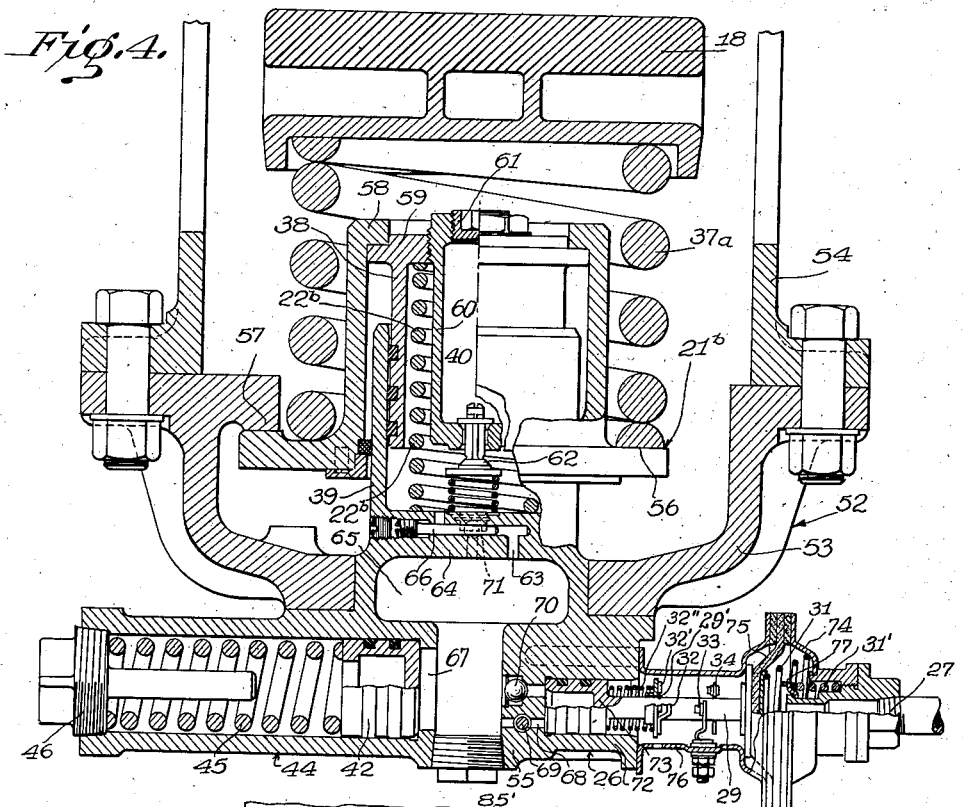
Figure 4 is a transverse cross-section of an instrument in which the hydraulic system is embodied.
Figure 5:
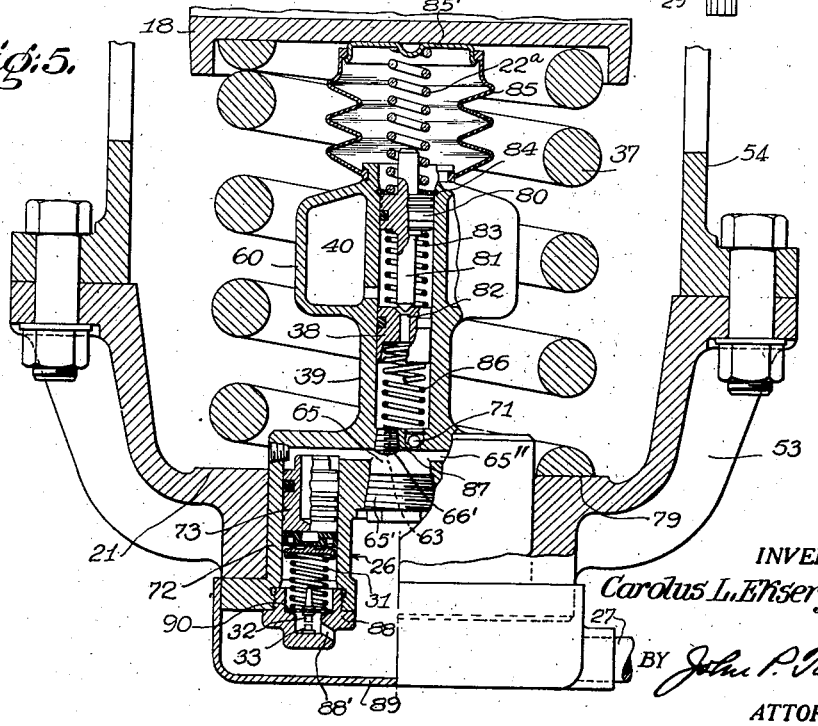
Figure 5 is a similar view to Figure 4 of another form of such instrument.

With this understanding attained through the diagram, one is able now to follow readily the operation of the instruments shown in Figs. 4, 5 and 6 for carrying out my invention in actual practice. Here again parts having corresponding functions bear similar reference numerals, and, referring to Fig. 4, one finds that 18 is the torque arm, 21b is the spring seat on the frame, (in this case floating), 37a is a high rate spring (not necessarily calibrated in this case), 39 is the hydraulic cylinder, the piston 38 of which is acted upon by the torque arm 18 (in this case through the high rate spring 37a however), 44 is the expansion chamber with its piston 42, spring 45 and adjustable abutment 46, and 26 is the pilot line cylinder device having connection 27 with the pilot line and carrying control device contacts 32, 33 and 34.

More specifically, this instrument, designated generally 52, is suspended by a bracket 53 bolted to the underside of a support 54 attached to the truck frame (not shown). The main body of the instrument per se consists of a single casting 55 containing all of the cylinders and all of the communicating ducts. In general, this casting is an inverted T in shape, cylinder 39 constituting the main branch of the T and cylinders 44 and 26 the top of the T. Piston 38 of cylinder 39 is operated from the floating spring seat 21b, the spring seat proper 56 of which bottoms on an inward extension 57 of bracket 53 to limit its upward movement, and tops by an extension 58 upon the top 59 of the piston 38 of cylinder 39. Piston 38 is hollow, and contains within its hollow the return spring 22b which reacts directly against it. It also contains a reentrant chamber portion 60 which constitutes the reservoir or fluid maintaining device for the instrument. This chamber and the entire fluid system may be filled with the fluid 40 through a removable cap 61. It dispenses fluid 40 to the system through an outwardly-opening, spring-retained check valve 62 at its bottom. The arrangement is such that, when the parts are in the position shown, piston 38 being fully retracted, the valve 62 is open and the fluid is taken from the chamber 60 into the system past the top enlargement of the valve stem (which is provided merely to prevent the valve from dropping through the port in the chamber 60 and not to effect a closure of the port) and between the fluted valve stem and the walls of the port, and when the piston 38 is displaced, the conical seat of the valve 62 seats against the corresponding conical seat in the bottom of the chamber 60, thereby closing the valve.

Communication between cylinder 39 and cylinders 45 and 26 is by means of a valve regul ted duct 63 in the partition wall 64 between the cylinder 39 and the communicating chamber 65 between these several cylinders which takes the place of the duct 41 of the diagram of Fig. 3. Control of duct 63 is by the tapered pin valve 66.

Construction at this point is in addition to the diagram showing of Figure 3.

Communication with the surge relief device or expansion chamber 44 is by the open inner end 67 of its cylinder 43.

Communication with the cylinder 26 may be by the further restricted duct 68 controlled by a tapered pin valve 69 in all respects similar to the valve 66. A ball check 70 opening toward the chamber 65 may be provided to constitute an unrestricted return duct from cylinder 26. A similar valve 71 in the wall 64 may constitute a similar unrestricted return duct for fluid flowing back to the cylinder 39.

The pilot pressure device 26 is really comprised of two cylinder devices. That subjected to fluid 40 of the fluid system kept filled from reservoir 60 comprises a cylinder 72 and piston 73, while that subjected to pilot line pressure from connection 27 comprises a casing 74 and diaphragm 75. The piston 73 and diaphragm 75 are rigidly interconnected by the piston rod 29 and thus in effect constitute one and the same piston. However, the casing 74 and cylinder 72 are spaced apart by an intervened casing extension 76 which houses the control contacts 32, 32', 33 and 34 (four contacts being employed in this case instead of three as in Fig. 3).

It will be noted that contact 32 is divided, one part designated 32 coacting with contact 33 and the other 32', with contact 34, and both are yieldably held against a stop 29' on the piston rod 29 by a spring 32". This is for the purpose of proper control circuit division of no particular concern here.

A further modification of the system of Figure 3 is found in the spring 31. In this case, I have provided two such springs, one designated 31 of a light order and the other one designated 31' of a heavier order, the spring 31 affording the following-up characteristics for application valve control contacts 32 and 33 first to be engaged, and the spring 31' of the heavier order supplying the following-up characteristics for exhaust valve control contacts 32' and 34 next to be engaged. Spring 31 is a conical spiral extending directly between diaphragm 75 and the casing 74. Spring 31 is a cylindrical spring engaged between the removable head through which pilot line connection is effected, and an axially movable spring seat 77 carried by the head having an axial extension toward the diaphragm adapted to be engaged thereby.

This device operates in all essential respects like that in the diagram of Figure 3 except that the entire torque is measured and not merely a proportional fraction thereof, as in Figure 3, because the entire load from the torque arm is taken through the hydraulic system, since the spring 37a and the hydraulic system are in this case arranged in series.

The spring 37a and the hydraulic system act in a manner similar to the spring 22a and the hydraulic system in diagram of Figure 3 to iron out the surges caused by the high frequency oscillations of the arm 18 due to inertia, and the pressure in back of the piston 73 is proportional to the true torque divorced of the inertia effects. The restricted orifices 63 and 68 correspond to the restricted orifice 47 in Figure 3 to aid in damping out the surges in the system caused by these oscillations. The liquid system is always maintained filled by the supply reservoir 60. Contacts 32, 33 and 32', 34 are successively closed when the torque reaches a predetermined value so that the fluid pressure behind piston 73 overcomes the resultant action of the springs 31 and 31' and the called for pressure in the pilot line, to operate the control circuits to the application and exhaust valve devices, respectively, to control the brake in a manner similar to the control shown in Figures 2, 2a and 3.

When the pilot pressure is removed and the brakes released by the usual operation from the engineer's cab, of course the torque arm 18 is raised and the parts are restored to the normal position shown, and fluid, which under the increased pressure has entered the devices 44, 26 and the chamber 65 from cylinder 39, is carried back into that cylinder by way of the backwardly opening check valves 70 and 71, respectively, when the piston 38 is raised by the action of spring 22b aided by springs 45, and 31, 31' acting through the column of liquid filling the system.

The instrument of Figure 5 in action is very similar to the action of the diagrammatic showing of Figure 3 but differs from instrument of Figure 4 in several respects, but outstandingly in the arrangement of the heavy spring 37 and the light calibrated spring 22a in parallel rather than in series as in Figure 4, each having independent extension from torque arm 18 and relatively fixed seats 79 and 80, respectively. The heavy spring 37 is seated permanently upon seat 79 carried by the bracket 53 which supports the several cylinders 39, 26 and 44. Spring 22a, as in Figure 3, bears upon the piston 38 of cylinder 39, but in this case through a supplemental valve controlling piston designated 80 having a stem 81 which controls valve 82 through which the replenishing fluid 40 is fed into cylinder 39 through the head of piston 38 from the reservoir 60 which in this case surrounds the upward extension of cylinder 39 instead of being contained within the piston 38 as in the form of Figure 4. The supplemental piston 80, which is nothing more than a fluid seal, is provided with a restoring spring 83, the function of which is normally to keep the valve 82 open and the sealing piston 80 up against the stop 84 provided at the upper end of the cylinder. A rubber boot 85 between cup 85' bearing against torque arm 18 and the upper end of the cylinder provides a dust seal for this upper end and for the spring 22a.

A retracting spring 86 is provided for the piston 38, this spring engaging the piston on its underside and reacting against the bottom wall 87 of the cylinder. In this case, the chamber 65 is formed concentrically with the cylinder 39 and the reservoir 60. Communication between cylinder 39 and chamber 65 is by way of a restricted duct 63 which in this case is shown provided in a removable plug 66'. The size of the duct 63 may be varied by substituting plugs having different size orifices as in Figure 3.

The chamber 65 may be closed at the bottom by a removable closure plug 65' just as in Figure 4, and communicates with an expansion chamber (not shown) but similar in construction and functioning to the expansion chamber of Figure 4 through a passage indicated at 65''.

The expansion chamber and a plurality of angularly spaced pilot pressure responsive pilot cylinders 26 are arranged concentric to the chamber 65 and communicate therewith. Instead of a single pilot cylinder 26 controlling a pair of circuits successively, this arrangement employs separate cylinders each controlling a different control circuit, one an application valve circuit and the other an exhaust valve circuit. Only one of these is shown because they are all alike in general construction and arrangement, although they are set to operate the contacts at different pressures. Each such device 26 comprises a cylinder 72, piston 73 and a reacting follow-up spring 31 (or 31' as the case may be) reacted between the bottom end of the piston 73 and the head 88 of the cylinder. The whole interior of the casing 89 surrounding the several devices 26 is open to pilot pressure through a duct 27, and this interior communicates with the cylinder 72 as through suitable port 88'. The contacts 32, 33 are arranged in normally spaced relation in the head 88 of the cylinder to be operated by the piston to close the circuit controlled thereby when the pressure above piston 73 rises sufficiently to overcome the combined action of spring 31 and the air pressure in the pilot line.

So organized, this device functions in a manner similar to the diagram of Figure 3 to damp out the superficial torque variations for all heights of the torque as measured by the principal and stiff spring 37, because the spring 22a and the associated devices of cylinders 39, 26 and 44 are in parallel constantly. The control contact 32 is depressed by the fluid pressure above piston 73, thereby deflecting its spring support 90 toward a conical seat on part 88 until the contact 32 engages the contact 33 when the piston 73 is sufficiently depressed. The operation of each cylinder 26 is essentially the same as that shown in Figure 4, except that each is set to operate the contacts it controls with a different pressure. As in the other forms, one control cylinder 26 may be for cutting off the pressure to the brake cylinder and another for effecting release of brake cylinder pressure or exhaust. In this device, irrespective of whether the rate of spring 37 is very well suited to some particular torque or not, at all torques the devices 39, 26 and 44 function to iron out irregularities.

Return to normal of the device effects return of fluid through the various ducts and channels and as well through the backwardly operating check valve 71 in the wall 87 between cylinder 39 and the chamber 65. Replenishment of fluid in the system by way of valve 82 takes place very similarly to that in Figure 4 through the check valve 62, the reservoir 60 being normally open to cylinder 39 and, upon the arm 18 being depressed, the valve stem 81 functions to close valve 82 just as the valve 62 is closed.

The instrument of Figure 6 is also very similar in action to the diagrammatic showing of Figure 3 and the instrument of Figure 5, but its structure is greatly simplified. Parts having corresponding functions are generally referred to by the numerals of the corresponding parts in Figures 3 and 5.

Numeral 18 designates the torque arm, 37 the heavy spring between the torque arm and its seat 79 on the bracket 53 which supports the instrument; 22a designates the light calibrated spring operating upon the cylinder device 39a, 47a the restricted orifice, and 26a the control cylinder device.

More specifically, the instrument, designated as a whole by the numeral 91, may comprise a bottom casting 92 having a flange 93 through which the instrument is bolted to the bracket 53. The top of this casting extends into recess 94 in the bracket, and from the upper end of this recess, an opening 95 extends through the bracket in concentric relation to the spring 37 and its seat 79.

The casting 92 is provided with upper and lower bores 96 and 97 which are separated by a transverse wall 98 in which are mounted a pair of contacts 99, 99 for cooperation with a bridging contact 100, the contacts 99, 99 having usual binding posts for the connection of circuit wires extending into bore 97. The bottom of the bore 97 may be closed by a closing plate 101 held in place by a screw 102 screwing into a threaded hole in the wall 98.

The walls of the upper bore 96, the transverse wall 98 and an upper closure for the bore, consisting in this case of a flexible diaphragm 103, form a closed variable size chamber corresponding in function to cylinder and piston device 26 of Figures 2a, 3, 4 and 5. This chamber, when the brakes are being applied, is subject to the called-for air pressure in the pilot line, which acts to raise the diaphragm, and in this, it is aided by the calibrated compression spring 31, acting between the wall 98 and the diaphragm 103.

A very much simplified hydraulic system is interposed between the light spring 22a and the diaphragm 103. This system is a hermetically closed system, so no provision need be made for the automatic supply of fluid as in the instruments of Figures 4 and 5.

It is closed at the top by a top diaphragm 104 in all respects similar to the bottom closing diaphragm 103, and upper and lower chambers 105 and 106 are formed by a peripherally thickened spacer member 107 having corresponding bores extending inward from its top and bottom sides separated by a transverse partition wall 108. The chambers formed between the top and bottom diaphragms and the partition wall 108 are normally filled with a hydraulic fluid 40, as in the other forms, described, and these chambers intercommunicate through the restricted passage 47a in the wall 108.

The parts 92, 103, 107, 104 are all clamped together to hermetically seal the chambers containing the fluid by a peripheral series of bolts, as 109. These bolts may additionally secure a guide sleeve 110 provided for the spring 22a which bears against a cup 111 seated against the central portion of diaphragm 104 at its lower end and at its upper end engages an abutment 112. The upward movement of this abutment may be limited by a screw 113 guided in a slot 114 in the sleeve 110. The abutment may have secured to it an inner sleeve 115 adapted to slide freely in the sleeve 110 and an outer and longer sleeve 116 adapted to overlap the outer face of the sleeve 110 and guide the abutment in its movements. At the top, the sleeves 115 and 116 are joined to a cup member 117 which directly engages the torque arm 18.

The spring 31 is stronger than spring 22a, so that in normal position the diaphragm 103 is always forced upwardly into engagement with a stop 118 secured to the under face of the transverse partition wall 108.

In this position of the parts, the bridging contact 100 which is interposed between the spring 31 and the diaphragm 103 is always held in spaced relation to the contacts 99. When the bridging contact is forced down by the pressure of the torque arm under braking torque, acting proportionally to the torque upon the light spring 22a, at a predetermined torque the contact 100 will engage the contacts 99 to close a control circuit. Such circuit may control simultaneously a shut-off and exhaust valve device for shutting off the entrance of air to the brake cylinder and at the same time exhaust air from the brake cylinder through an orifice of predetermined dimensions. In this case, I have shown but a single circuit closure, but it is understood that a plurality of circuit closures could be provided as in the other forms to control a plurality of control circuits in sequence, rather than simultaneously.

The device of Figure 6 operates essentially similarly to the devices of Figures 3 and 5, the spring 22a and the restricted orifice 47a tending to iron out the irregularities due to the inertia movements of the arm 18 and causing the pressure in the lower chamber of the hydraulic system to be substantially a measure of the torque developed by the brake. When the torque reaches a predetermined point, the pressure in this chamber exceeds the combined pressure of the called-for pilot pressure, supplied to the chamber below diaphragm 103 through a pilot line conduit as 27, and the spring 31, both acting in opposition to the hydraulic pressure, so that the diaphragm 103 is depressed until the contact 100 bridges the contacts 99 and closes the control circuit to release the pressure in the brake cylinder. After the pressure in the cylinder is so released, the torque drops and the contacts are separated, because the pilot line pressure and the spring 31 act through the fluid to cause some of it to return through the orifice 47a into the upper chamber to raise the diaphragm 104 against the action of spring 22a.

While I have shown a number of different embodiments of my invention in this application, I do not wish to be understood as having exhausted the possibility of vairations in these embodiments. I am quite sure that there will be numerous others which will occur to those skilled in the art as the utilization of my invention in actual service widens. Moreover, in the annexed claims, I do not wish to be limited in the circumstantial terminology which I have chosen, for the breadth and depth of the generic spirit of the invention is unavoidably greater than that which can be expressed by so circumstantially chosen terms.

What is claimed is:

1. A brake control for vehicles having a wheel and axle assembly and a frame supported from said assembly, a rotatable member to be braked carried by said assembly, a non-rotatable braking member and a support therefor carried in part at least by said frame and including an arm capable of movement relative to said frame under braking torque and inertia forces and transmitting braking torque to said frame, and operator-controlled means for relatively moving said rotatable braked and non-rotatable braking members into braking or non-braking positions, in combination with a torque measuring device interposed between said arm and frame, said measuring device comprising a relatively soft low-rate spring opposing the movement of said arm under light or no-load torques and further but stiffer yielding means opposing additional and increased resistance to movement of said torque arm under higher torque, and a control device associated with said arm and torque measuring device and operated at a predetermined torque to modify the operator's control of the braking and automatically prevent the braking torque from exceeding said predetermined torque.

2. A brake control according to claim 1 in which the stiffer yielding means includes an expandable fluid pressure device opposing the movement of the torque arm by the instantaneous pressure called for by the operator in a pilot line of a fluid pressure braking system.

3. A brake control according to claim 1 in which the stiffer yielding means includes an expandable air pressure device opposing the movement of the torque arm by the instaneous pressure called for by the operator in a pilot line of a fluid-pressure braking system, and in which the action of the torque arm on the air pressure device is freed of sudden variations by an interposed hydraulic power transmitting system having a restricted passage between the receiving and transmitting ends thereof.

4. A brake control according to claim 1 in which the stiffer yielding means includes an expandable air pressure device opposing movement of the torque arm by the instantaneous pressure called for by the operator in a pilot line of a fluid pressure braking system, and in which the movement of the torque arm is freed of sudden variations by an hydraulic power transmitting device having an expansion chamber device and a restricted passage between its receiving end operated by the torque arm and its transmitting end opposed by the pilot line pressure.

5. A brake control according to claim 1 in which the stiffer yielding means includes a stiff spring opposing the movement of the torque arm in the higher torque ranges.

6. A brake control according to claim 1 in which the stiffer yielding means includes an expandable and contractable fluid pressure device arranged concentrically with the soft low-rate spring, and the said device opposes the movement of the torque arm by the instantaneous pressure called for by the operator in a pilot line of a fluid-pressure braking system.

7. A brake control according to claim 1 in which the brake is operated under control of the operator by a fluid-pressure brake cylinder, and the control device associated with the torque arm includes means for preventing the building up of further pressure in the brake cylinder and releasing the pressure in said cylinder.

8. A brake control according to claim 1 in which the stiffer yielding means includes an expandable air pressure device opposing movement of the torque arm by the instantaneous pressure called for by the operator in a pilot line of a fluid-pressure braking system, and in which the movement of the torque arm is freed of sudden variations by an hydraulic power transmitting device interposed between the torque arm and the expandable air pressure device, said power transmitting device including a master cylinder operated by the torque arm, a motor cylinder operated in opposition to the pilot line pressure and connections between said master and motor cylinder designed to convert variable impulses transmitted to the former into integrated continuous pressure in the latter.

9. A brake control according to claim 1 in which the stiffer yielding means includes an expandable air pressure device opposing movement of the torque arm by the instantaneous pressure called for by the operator in a pilot line of a fluid-pressure braking system, and in which said torque measuring device further includes means for integrating sudden variations in torque arm movement by said stiffer yielding means and transmitting such integrated torque values to oppose said expandable air pressure device.

10. A brake control for vehicles having a wheel and axle assembly and a frame supported from said assembly, a rotatable member to be braked carried by said assembly, a non-rotatable braking member and a support therefor carried in part at least by said frame and including a part capable of movement relative to said frame under braking torque and inertia forces and transmitting braking torque and inertia forces to said frame, and operator-controlled means for relatively moving said rotatable braked and non-rotatable braking members into braking or non-braking positions, in combination with a torque measuring device including means for integrating the sudden variations in movement of said part under torque and inertia and for transmitting the integrated values to a control device, said control device being arranged, after a predetermined torque is attained, to modify the operator's control and automatically prevent said integrated torque value from exceeding said predetermined torque.

11. A brake control for vehicles having a wheel and axle assembly and a frame supported from said assembly, a rotatable member to be braked carried by said assembly, a non-rotatable braking member and a support therefor, carried in part at least by said frame and including a part capable of movement relative to said frame under braking torque and inertia forces and transmitting braking torque and inertia forces to said frame, and operator-controlled means for relatively moving said rotatable braked and non-rotatable braking members into braking or non-braking positions, in combination with a torque measuring device, an automatic control device for modifying the operator's control, said torque measuring device including means for integrating the rapid variations in combined torque and inertia reactions transmitted to it from said part, and activating said control device upon a predetermined integrated torque value having been attained to prevent the torque from rising appreciably above said value.

12. A brake control according to claim 11 in which said torque measuring device includes a soft low-rate spring and a stiff high-rate spring each opposing the movement of said part under braking torque, and the integrating means comprises a hydraulic power transmission system acted on at one end by said part through the low-rate spring and at the opposite end acting on the automatic control device, and an expansion chamber between the ends of the system, whereby the integrated torque value alone is transmitted to the control device.

13. A brake control for vehicles having a wheel and axle assembly and a frame supported from said assembly, a rotatable member to be braked carried by said assembly, a non-rotatable braking member and a support therefor carried in part at least by said frame and including an arm capable of movement relative to said frame under braking torque and inertia forces and transmitting braking torque and inertia reactions to said frame, and operator-controlled means for relatively moving said rotatable braked and non-rotatable braking members into braking or non-braking positions, in combination with a torque-measuring device interposed between said arm and frame and subject to the torque reactions as well as inertia reactions of said arm, said device comprising means for damping out the inertia reactions and converting the torque reactions into translatory movement of a control device movable proportionally to the torque reaction of said arm, the control device being adapted upon a predetermined torque reaction to modify the operator's control of the brake and prevent the torque reaction from exceeding a predetermined value.

14. A brake control for vehicles having a wheel and axle assembly and a frame supported from said assembly, a rotatable member to be braked carried by said assembly, a non-rotatable braking member and a support therefor carried in part at least by said frame and including an arm capable of movement relative to said frame under braking torque and inertia forces and transmitting braking torque and inertia reactions to said frame, and operator-controlled means for relatively moving said braked and braking members into braking or non-braking positions, in combinations with a torque-measuring device interposed between said arm and frame and subjected to combined torque and inertia reactions, the device embodying means for damping out the inertia reactions but transmitting the torque reactions whereby a true measure of torque may be obtained through which the brake may be controlled.

15. A brake control for vehicles having a wheel and axle assembly and a frame supported from said assembly, a rotatable member to be braked carried by said assembly, a non-rotatable braking member and a support therefor carried in part at least by said frame and including an arm capable of movement relative to said frame under braking torque and inertia forces and transmitting braking torque and inertia reactions to said frame, and operator-controlled means for relatively moving said rotatable braked and non-rotatable braking members into braking or non-braking positions, in combination with a torque-measuring device interposed between said arm and frame and subject to the torque reactions as well as the inertia reactions of said arm and including means for damping out the inertia reactions and transmitting to a control station only the torque reactions, whereby the operator's control may be modified by a torque-operated control dependent upon a predetermined torque.

16. The method of controlling vehicle brakes having a torque arm through which braking torque is transmitted to the vehicle frame, and the arm is subjected to and movable under both inertia and torque reactions, comprising the damping out of the inertia reactions from the torque reactions and the utilization of the true torque reactions to limit the braking torque below a predetermined value.

17. The method of controlling vehicle brakes having a torque arm through which the braking torque is transmitted to the vehicle frame and the arm is subjected to and movable under both inertia and torque reactions, comprising the measuring of the torque reactions with the inertia reactions damped out, and the utilization of such true torque measurements to effect a control upon the brakes independent of the operator's control.

18. The method of braking vehicles having a frame supported by a wheel and axle assembly and a brake support having an arm transmitting torque developed by the vehicle brakes to said frame, which arm is subjected to and movable under both inertia and braking torque reactions, comprising the measuring of the torque reaction with the inertia reaction effect damped out, and the utilization of said measured torque to control the torque developed by the brakes and hold the same below a predetermined maximum value, thereby minimizing wheel slide.

19. A control for vehicle brakes in which the torque and inertia reactions are transmitted through a brake supporting arm to the vehicle frame and the brakes are applied by an operator-controlled pneumatic cylinder, a torque measuring device interposed between said arm and frame including means for divorcing the inertia reactions from the torque reactions transmitted through said arm, aand control means associated with the torque-measuring device and arm for modifying the operator's control of the air pressure in the brake cylinder in accordance with predetermined torque conditions.

20. A torque measuring device for measuring the torque developed by a brake independent of the effect of inertia forces acting on the part from which the torque measurement is taken comprising a hydraulic system interposed between said part and a fixed support, said system comprising an expandable and contractable fluid chamber at one end and another such chamber at the other end, each said chambers comprising a fixed and a movable part for varying the volume of the chamber, a restricted passage between the fixed parts of said chambers, the movable part of the first chamber being acted on by the part whose torque is to be measured and the movable part of the other chamber being adapted, through the damping action of said restricted passage, to give an indication proportional to the true torque values.

21. A brake control for vehicles having a wheel and axle assembly and a frame supported from said assembly, a rotatable member to be braked carried by said assembly, a non-rotatable braking member and a support therefor carried in part at least by said frame and including a part capable of movement relative to said frame under braking torque and inertia forces and transmitting torque and inertia reactions to said frame, and operator-controlled means for relatively moving said rotatable braked and non-rotatable braking members into braking or non-braking positions, in combination with a torque-measuring device actuated by said arm and including means for damping out vibrations of said arm due to inertia forces and for transmitting the true torque reactions to a control device, said control device being arranged to be operated by said torque-measuring device to modify the operator's control under predetermined torque conditions.

22. A brake control for vehicle brakes in which torque and inertia reactions are transmitted through a brake support to the vehicle frame and the brakes are applied by an operator-controlled brake cylinder pressure, a stiff spring interposed between the support and frame to take most of said reactions, a control device, a torque-measuring device arranged in parallel to said spring and having means to damp out the inertia reactions and transmit a force proportional to the true torque developed by the brake to said control device, said control device, under predetermined torque conditions, being operative to modify the operator's control of the brake cylinder pressure.

23. In combination, a brake support subjected to braking torque and inertia reactions, a vehicle frame, and a stiff spring between said support and frame to take said reactions, a torque-measuring device also arranged between said support and frame in parallel relation to said spring, said measuring device including a light spring and a hydraulic system having an expandable and contractable fluid chamber at one end and another such chamber at the other end, said chambers each comprising a fixed and a movable part for varying the volume of the chamber, a restricted passage between the fixed parts of said chambers, the movable part of the first-named chamber being acted on by the light spring, the opposite end of which acts on the support, a third spring stronger than said light spring acting against the movable member of the last-mentioned chamber, in opposition to the action of the light spring through the hydraulic system, the movable member of said last-named chamber being adapted to give an indication of the torque developed.

24. A brake control for vehicle brakes in which torque and inertia reactions are transmitted through a brake support to the vehicle frame and the brakes are applied by operator-controlled brake cylinder pressure, a stiff spring interposed between the support and frame to take the greater part of said reactions, a control device, a torque-measuring device arranged in parallel to said stiff spring and including a light spring operating on a movable member of a hydraulic system, said system acting to damp out the inertia reactions transmitted to it by the light spring and transmitting to the control device a force proportional to the true torque developed by the brake, said control device, under predetermined torque conditions, being operative to modify the operator's control of the brake cylinder pressure.

CAROLUS L. EKSERGIAN.